United States Patent [19]
Davis, Jr. et al.

[11] Patent Number: 5,427,313
[45] Date of Patent: Jun. 27, 1995

[54] METHOD AND CONTROL SYSTEM FOR CONTROLLING AN AUTOMATIC HVAC SYSTEM TO PREVENT THE DISCHARGE OF AIR WITHIN A PREDETERMINED TEMPERATURE RANGE

[75] Inventors: Leighton I. Davis, Jr., Ann Arbor; Thomas F. Sieja, Dearborn; Gerhard A. Dage, Franklin; Robert W. Matteson, Ann Arbor, all of Mich.

[73] Assignee: Ford Motor Company, Dearborn, Mich.

[21] Appl. No.: 83,757

[22] Filed: Jun. 30, 1993

[51] Int. Cl.⁶ .............................................. F24F 7/00
[52] U.S. Cl. .................. 236/49.3; 236/91 C; 236/91 F; 165/42
[58] Field of Search .............. 236/91 C, 91 R, 91 D, 236/91 F, 49.3; 62/244, 177, 179, 180; 165/12, 16, 42, 43; 237/5

[56] References Cited

U.S. PATENT DOCUMENTS

| | | | |
|---|---|---|---|
| 4,004,126 | 1/1977 | Boaz | 219/203 |
| 4,078,635 | 3/1978 | Dance et al. | 188/1 B |
| 4,350,286 | 9/1982 | Sutoh et al. | 236/44 A |
| 4,424,933 | 1/1984 | Sutoh et al. | 236/44 A |
| 4,852,363 | 8/1989 | Kampf et al. | 62/176.6 |
| 4,896,589 | 1/1990 | Takahashi | 98/2.01 |
| 4,910,967 | 3/1990 | Takahashi | 62/176.1 |
| 4,914,924 | 4/1990 | Takahashi | 62/133 |
| 4,917,293 | 4/1990 | Fedter et al. | 236/49.3 |
| 4,920,755 | 5/1990 | Tadahiro | 62/171 |
| 4,963,716 | 10/1990 | Van Den Elst et al. | 219/202 |
| 5,057,666 | 10/1991 | Takada | 219/203 |
| 5,148,977 | 9/1992 | Hibino et al. | 236/49.3 |
| 5,156,013 | 10/1992 | Arima et al. | 62/148 |
| 5,165,595 | 11/1992 | Horio et al. | 236/49.3 |
| 5,167,365 | 12/1992 | Mitoshi et al. | 236/49.3 |

OTHER PUBLICATIONS

"Application of Fuzzy Logic to Approximate Reasoning Using Linguistic Synthesis", by Ebrahim H. Mamdani, IEEE Transactions On Computers, vol. C-26, No. 12, Dec. 1977, pp. 1182–1191.

"Special Tools and Chips Make Fuzzy Logic Simple", by Gary Legg, Senior Tehnical Editor, EDN, Jul. 6, 1992, pp. 68–76.

*Primary Examiner*—Harry B. Tanner
*Attorney, Agent, or Firm*—Roger L. May; Richard D. Dixon

[57] ABSTRACT

Method and control system for controlling an automotive HVAC (heating, ventilation and air conditioning) system to prevent the discharge of air within a predetermined temperature range. The control system responds to signals generated by various climate control sensors to prevent the HVAC system from producing air at an uncomfortable range of temperatures. Fuzzy logic calculations are performed based on fuzzy rules and membership functions to provide nonlinear compensation and to allow the control to be expressed in the same heuristic terms that an occupant could use in describing the level of comfort.

12 Claims, 15 Drawing Sheets

Fuzzy Logic EATC System Diagram

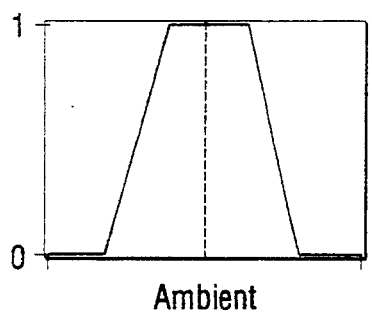
*Fig. 11c*
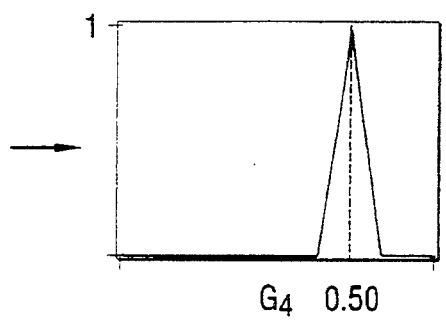
*Fig. 11d*
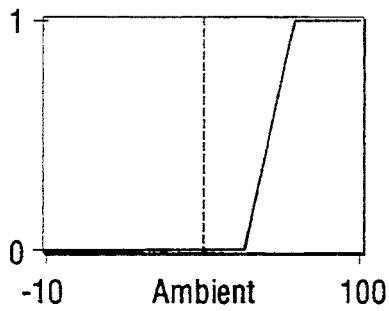
*Fig. 11e*
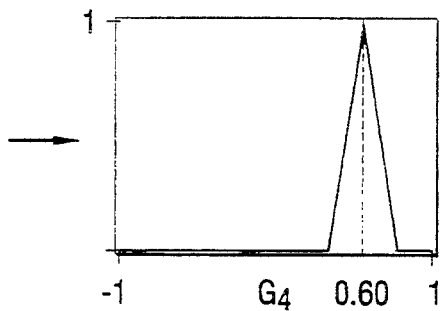
*Fig. 11f*
*Fig. 12*
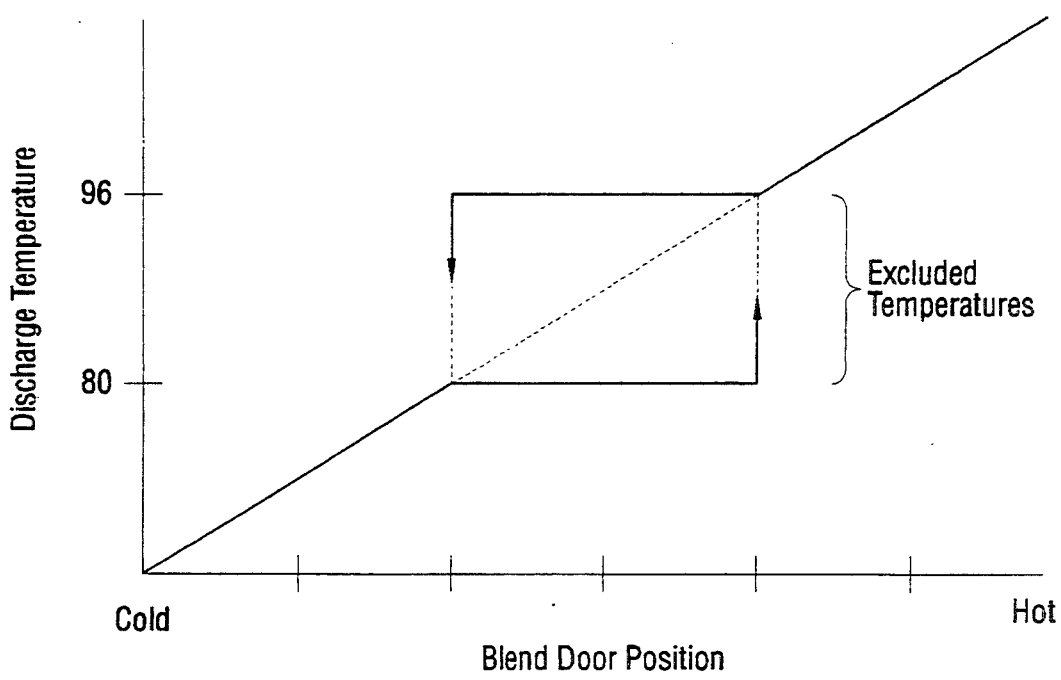

METHOD AND CONTROL SYSTEM FOR CONTROLLING AN AUTOMATIC HVAC SYSTEM TO PREVENT THE DISCHARGE OF AIR WITHIN A PREDETERMINED TEMPERATURE RANGE

CROSS-REFERENCE TO RELATED APPLICATIONS

This application is related to U.S. patent application Ser. No. 08/083,756 filed on Jun. 30, 1993 entitled "Method And Control System For Controlling An Automotive HVAC System" and U.S. patent application Ser. No. 08/083,589 filed on Jun. 30, 1993 entitled "Method And System For Modifying A Linear Control Algorithm Which Controls An Automotive HVAC System", both of which have the same inventive entity and are assigned to the same assignee and as the present application.

1. Technical Field

This invention relates to methods and control systems for controlling an automotive HVAC system and, in particular, to methods and systems for controlling an automotive HVAC system to prevent the discharge of air within a predetermined temperature range.

1. Background Art

A fundamental goal of automotive heating, ventilating, and air conditioning (HVAC) systems is to make vehicle occupants comfortable. To achieve this goal, it is important that the design of the control system that establishes cabin conditions takes into account the relationship between comfort and the variables that affect comfort. Human comfort is a complex reaction, involving physical, biological, and psychological responses to the given conditions. Because of this complexity, the engineer must consider many variables and their possible interaction in the design strategy of such a control system or controller.

In an attempt to measure and control the many variables that affect comfort, modern automotive HVAC systems have many sensors and control actuators. A typical system might have a temperature sensor inside the cabin, one measuring ambient temperature outside and others measuring various temperatures of the system internal workings. The occupant may have some input to the system via a set point or other adjustment. Additional sensors measuring sun heating load, humidity, etc. might be available to the system. The set of actuators might include a variable speed blower, some means for varying air temperature, ducting and doors to control the direction of air flow and the ratio of fresh to recirculated air.

It falls to the controller to sort out the range of possible conditions, determine what is needed to achieve comfort, and coordinate the control of the set of actuators available. This multiple input, multiple output control problem does not fall into any convenient category of traditional control theory. The performance criterion, comfort, is not some well defined formula but a sometimes inconsistent goal, empirically determined. In particular, comfort control is not the same as temperature control. The response of the system as well as the relationship between system variables and desired performance, comfort, is rarely linear. Also, it is important to note that despite all the actuators and variables available for control, there may exist conditions under which comfort may not be achievable.

Due to practical considerations of size, energy consumption, cost and the wide conceivable range of conditions that automobiles are exposed to, the system plant may simply not be able to supply what is needed. All these considerations lead to a control problem that is far from what is usually encountered in traditional control theory.

In the face of these difficulties, most control system designs have used what is familiar—linear control—and supplemented it by patched-in specific responses to handle special circumstances where necessary. In other words, typical automobile automatic climate control systems use linear proportional control to maintain a comfortable interior environment. However, there are two significant limitations of linear proportional control when viewed from the standpoint of an occupant's subjective comfort: first, there are certain control situations in any HVAC system that are inherently nonlinear, and second, it is not possible to realize occupant comfort merely by maintaining proximity to a desired temperature as described in greater detail hereinbelow.

The design of a typical HVAC climate control system starts with the need to provide acceptable occupant comfort levels under the most extreme high and low ambient conditions that a vehicle might encounter. For these conditions, the control system is requesting the HVAC unit to operate at peak output in one direction or the other. Design considerations center around plant capacity and the efficiency of heat transfer in order to handle these extremes. The control system is effectively saturated until one or more of the input signals indicate that some level of comfort control is achievable.

It is at this point that the system begins to moderate its control of blower speed, the location of discharge air (mode of operation), and the relative blend of cooled and heated air. The simplest approach to control in this region is to have the control follow a straight line between the two extremes. Such a linear control algorithm adjusts the outputs in an appropriate manner and its parameters are easy to determine based on the points of onset of the two extreme regions. With a well defined HVAC system and enough developmental evaluation time, one can tune the coefficients to provide acceptable levels of comfort for a variety of operating conditions. The linear approach is quite well understood and easy to implement. For a small microprocessor-based controller, its essence is captured in a few lines of code.

The linear approach has obvious limitations when dealing with nonlinear situations. All HVAC systems behave nonlinearly in various regions of their operation. The transfer of heat as a function of blower speed is nonlinear. The onset of any plant output limitation affects desired response in a nonlinear fashion. Factors affecting plant limitations may be tracked via additional sensors—for example, engine coolant temperature (ECT) correlates with heater core temperature—but again, the relationship is nonlinear. The usual approach to handling special nonlinear situations is to use logic-based modification of the usual linear strategy when these situations are detected. Thus, in cold weather, when ECT is below a certain threshold indicating that the heater core cannot warm the cabin, the blower would be shut off.

This particular solution to the problem of nonlinearities creates problems of its own. In the case of the binary ECT threshold switch, interaction with the linear strategy leads to difficulties. When the threshold ECT is passed, the switch turns on the blower. Since the car is cold, the blower immediately goes to its highest setting and creates two problems. The first is the noise level produced by the blower operating full out. The second problem is that all the residual cold air in the system is blown directly onto the customer's feet causing discomfort.

In addition to the current difficulties, new vehicle lines create additional problems that are not easy to overcome. The reduction in interior and under hood package space in current vehicle designs has caused the transfer function for discharge temperature to be even more nonlinear, especially when operating at the extremes of ambient temperature.

The response of crisp (as opposed to fuzzy) logic in a control strategy does not fit well when human comfort is the goal. Abrupt changes in environment are not perceived favorably by most people. It is true that the effect of sudden changes occasioned by crisp logic transitions may be masked via input or output filtering. Also, some of the resulting conditions may not be experienced by the occupant as a level of discomfort. For example, heater warmup, linear or nonlinear, has no effect on comfort on a hot day with the system at maximum cooling.

FUZZY LOGIC APPROACH

As previously mentioned, the description of comfort for most people is expressed in terms that are not particularly precise. If one asks people how they describe their comfort, we get answers such as "slightly cold", "fine", or "very hot." A person's comfort can easily be phrased in such vague terms but it is more difficult to interpret these expressions quantitatively. The imprecise nature of comfort description leads to the use of fuzzy logic in specifying a strategy for comfort control. Fuzzy logic provides procedures to incorporate knowledge expressed vaguely and yet arrive at a definite, calculable answer.

Fuzzy logic is a methodology for handling knowledge that contains some uncertainty or vagueness. The foundations of fuzzy logic were set forth in the 1960s by L. A. Zadeh in his paper entitled "Fuzzy Sets", INFORM. CONTR., 8 pp. 338–353, 1965.

In current engineering application, fuzzy logic is most often found in control problems in the form of a particular procedure, called "max-min" fuzzy inference as described by Ebrahim Mamdani in his paper entitled "Application of Fuzzy Logic to Approximate Reasoning Using Linguistic Synthesis", IEEE TRANSACTIONS ON COMPUTERS, (1977) C-26, No. 12, pp. 1182–1191. This procedure incorporates approximate knowledge of appropriate control response for different circumstances into sets of rules for calculating a particular control action. The rules are expressed in terms of "IF (situation holds), THEN (take consequent control action)". The degree to which a particular consequent action is taken depends on the degree to which its corresponding conditions hold. The linguistic expression of a situation or consequent control action is translated into a definite calculation via specified membership functions. A membership function quantifies what is meant by a phrase such as "The temperature is high" by defining the degree of membership in the class, "high", depending on the value of the input variable, temperature.

U.S. Pat. No. 5,148,977 uses an infrared sensor to measure wall temperature and uses that value to modify room temperature using fuzzy logic.

U.S. Pat. No. 5,156,013 discloses a control device for an adsorption refrigerator including a generator. A heating amount of the generator is controlled by a fuzzy logic calculation. The fuzzy logic algorithm utilizes a standard matrix approach choice of input and output membership functions to compute an output value in a standard fashion.

U.S. Pat. No. 4,914,924 senses driver intent along with air conditioning system state to balance the conflicting tradeoffs of powertrain performance versus air conditioning performance. Driver intent is sensed via a throttle position sensor and a preference switch. Air conditioning system state is sensed via the standard complement of sensors found in most systems. Standard fuzzy logic inference is used directly to sort out the tradeoffs as well as performing the usual functions of climate control.

SUMMARY OF THE INVENTION

An object of the present invention is to provide a nonlinear method and control system for controlling an automotive HVAC system to prevent the discharge of air within a predetermined temperature range so as to provide good air circulation and regulation of comfort.

In carrying out the above object and other objects of the present invention, a method is provided for automatically controlling a heating, ventilation and air conditioning (HVAC) system of a vehicle which discharges a flow of air at a discharge temperature to a passenger cabin of the vehicle. The system includes a variable speed blower, means for varying air temperature, ducting, actuators having control modes for controlling the direction of air flow and the ratio of fresh air to recirculated air and sensors for sensing temperature within the cabin, ambient temperature and a target set point temperature. The method includes the steps of determining the difference between temperature within the cabin and the target set point temperature to obtain a difference signal and defining membership functions and fuzzy rules between the difference signal and the control positions of the actuators. The method also includes the step of generating control signals to control the control mode of the actuators to prevent the system from discharging a flow of air into the cabin having a predetermined range of temperatures defined by first and second predetermined temperatures. The step of generating is based on the difference signal, the discharge temperature, the membership functions and the fuzzy rules.

Further in carrying out the above object and other objects of the present invention, a system is provided for carrying out each of the above method steps.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIGS. 11a through 11f are graphical illustrations of a gain variable, $G_4$, rule set including antecedent and corresponding consequent membership functions;

FIG. 12 is a graph of discharge temperature versus blend door position with excluded temperatures being illustrated by a hysteresis loop;

BEST MODE FOR CARRYING OUT THE INVENTION

Figure 1:
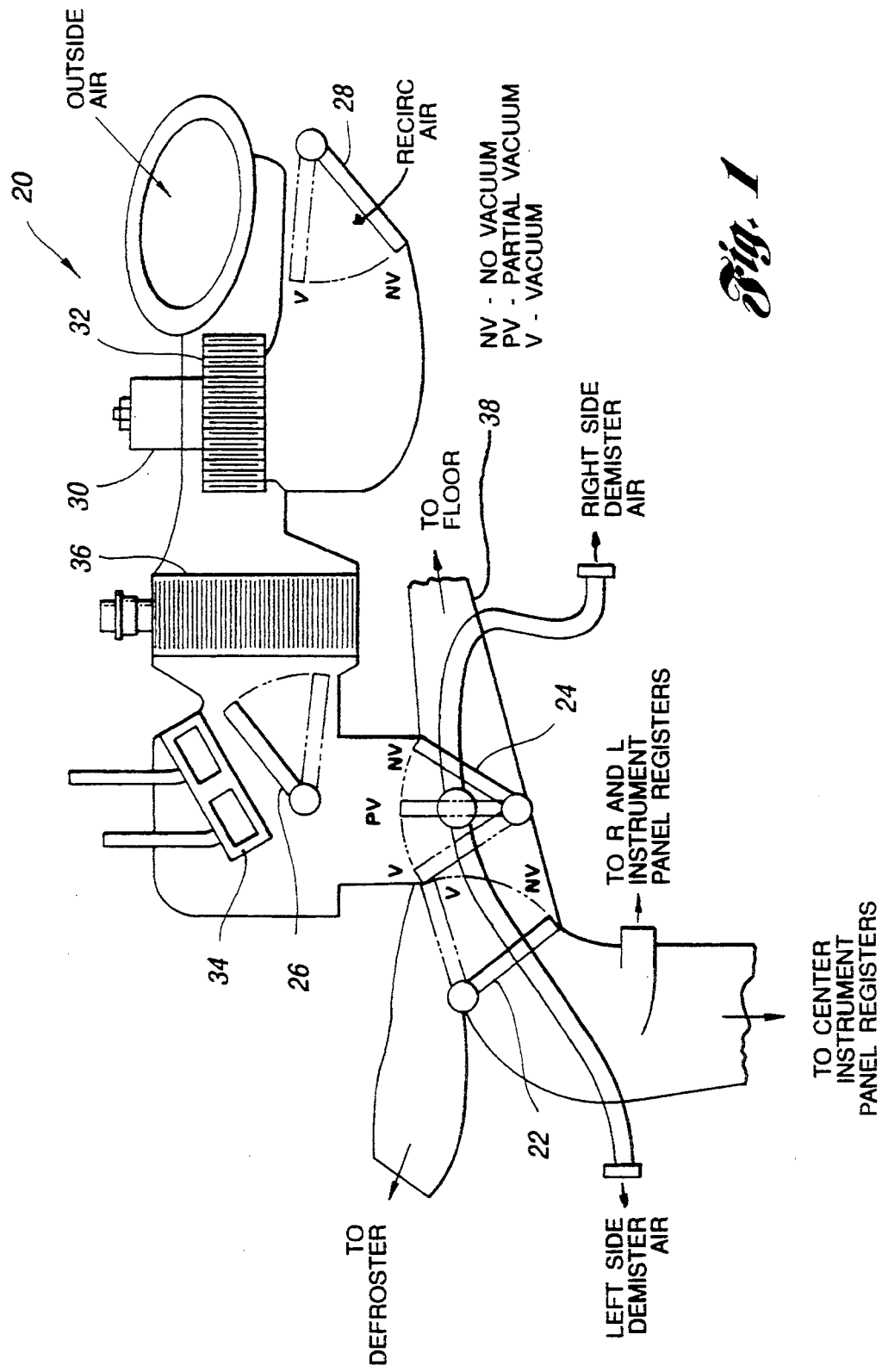
FIG. 1 is a schematic diagram illustrating an air handling system which can be controlled by the method and control system of the present invention.

In general, control of temperature within an automobile is accomplished using various actuators to adjust the temperature and flow of air supplied to the cabin of the vehicle. FIG. 1 shows schematically an air handling system of an HVAC (heating, ventilation and air conditioning) system, generally indicated at 20. The system 20 includes the arrangement of panel-defrost, floor-panel, temperature blend and outside recirc air actuators or doors 22, 24, 26 and 28, respectively. The doors 22, 24 and 28 are driven by vacuum motors (not shown) between their various vacuum, partial vacuum and no vacuum positions in a conventional fashion as indicated in FIG. 1. The door 26 is driven by an electric servo motor also in a conventional fashion.

The system 20 also includes a variable speed blower motor or fan 30 including a blower wheel 32.

The system further includes heating and cooling elements such as a heater core 34 and an evaporator core 36 in a typical vehicle air conditioning plant. Each of the above components is in communication with ducting 38 in order to control temperature, the direction of air flow and the ratio of fresh air to recirculated air.

Figure 2:
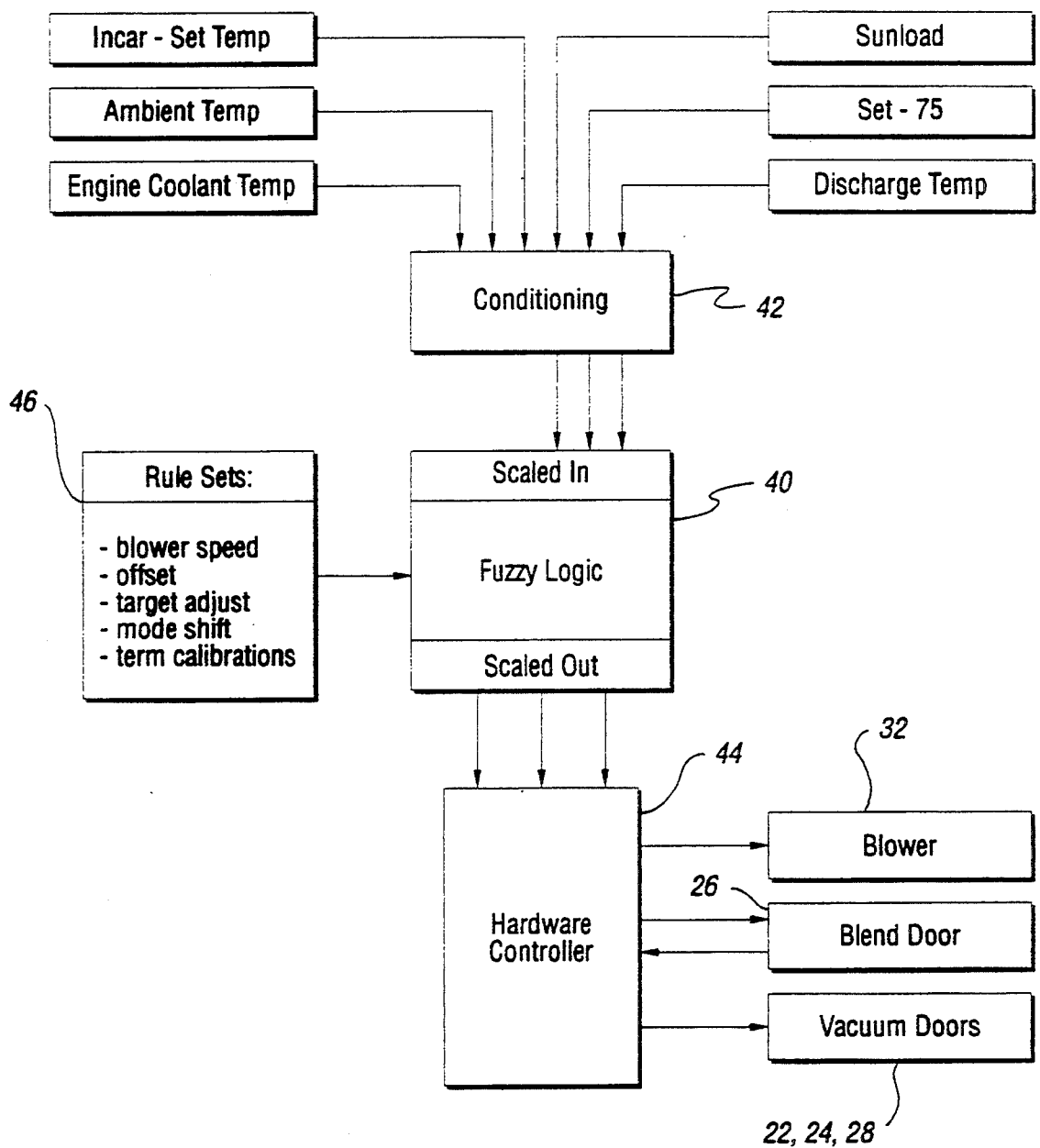
FIG. 2 is a schematic block diagram of the control system of the present invention.
Figure 3A:
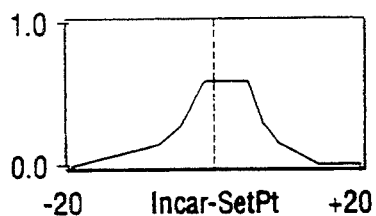
FIGS. 3a through 3m are graphical illustrations of a blower speed rule set including antecedent and corresponding consequent membership functions.
Figure 3B:
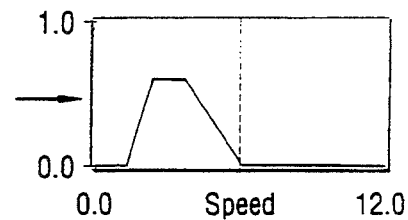
Figure 3C:
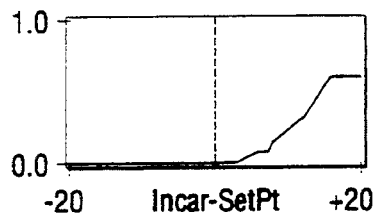
Figure 3D:
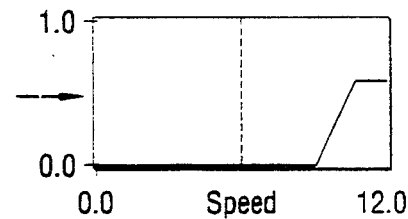
Figure 3E:
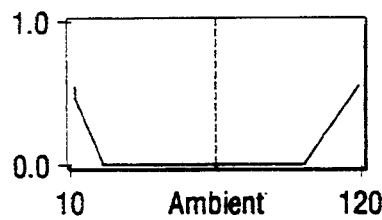
Figure 3F:
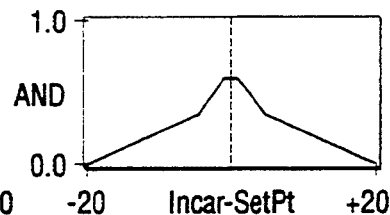
Figure 3G:
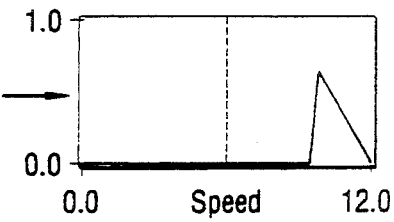
Figure 3H:
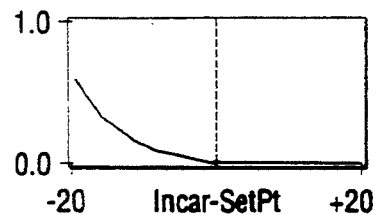
Figure 3I:
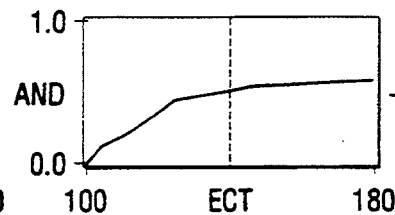
Figure 3J:
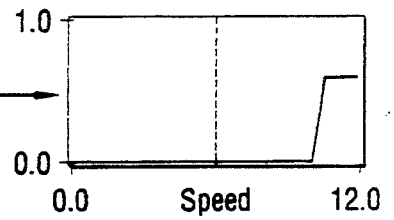
Figure 3K:
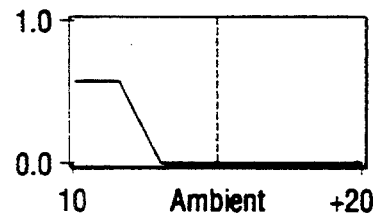
Figure 3L:
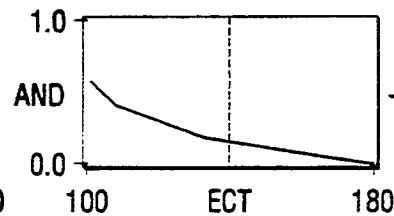
Figure 3M:
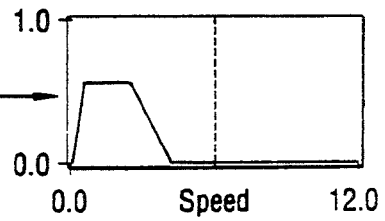

For automatic control of the temperature and flow of air in the cabin, conditions within and outside the cabin are monitored by sensors and an electronic controller generates signals to control the plant actuators according to the conditions as indicated by the sensors. As illustrated in FIG. 2, a typical complement of sensors of the HVAC system provide signals which are representative of in-car temperature, ambient (outside) air temperature, engine coolant temperature (ECT), discharge air temperature and sunload. In addition, there is a set signal or set temperature value indicating the desired temperature that is set manually by the driver. In turn, an incar-set temperature (in-car minus set temperature) signal and a set-75 (set temperature minus 75 degrees Fahrenheit) signal are generated or calculated.

The signals are provided to an electronic controller 40 as inputs after being conditioned by a conditioning circuit 42. The controller 40 scales the input signals and provides scaled output signals for use by a hardware controller 44 which, in turn, controls the doors 22 through 28 to regulate the temperature and flow of air and ultimately to maintain the comfort of driver and passengers in the vehicle.

Figure 16:
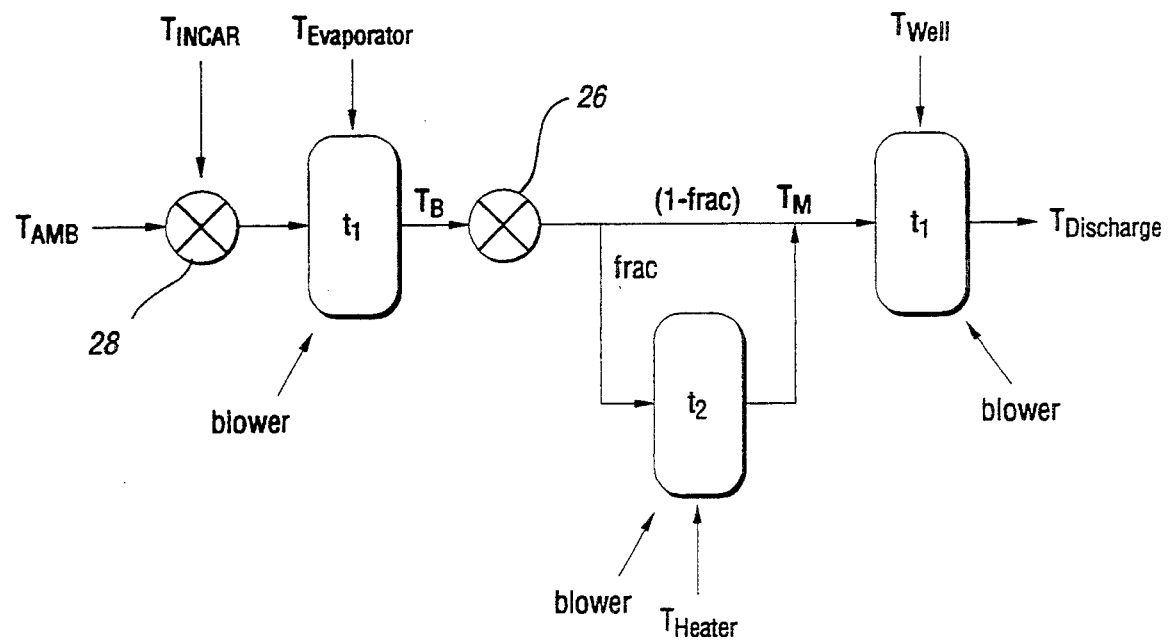
FIG. 16 is a schematic diagram of a model of the air handling system of FIG. 1.
Figure 17:
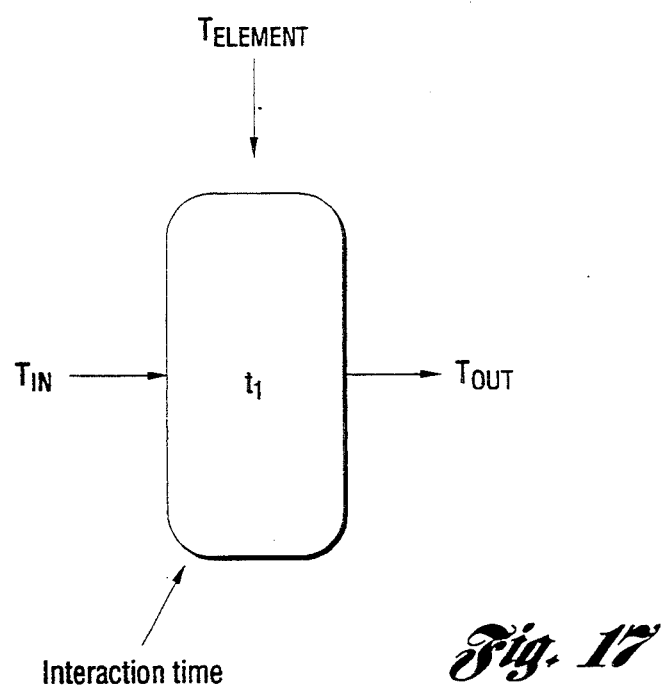
FIG. 17 is a schematic diagram of an example of a single interaction between a parcel of air having an input temperature and a part of the air handling system.

Referring to FIG. 16, there is illustrated a discharge temperature model based on a physical model of the climate control plant of FIG. 1. It is assumed that the process used to obtain a parcel of air at a particular temperature can be broken up into a series of interactions of that parcel and various elements of the system. FIG. 17 gives an example of one such interaction between a parcel of air at temperature $T_{in}$ and a plant element at temperature $T_{element}$. The temperature of the input air "decays" toward the temperature of the element, depending on how long the air is in contact with the element. The resulting temperature of the air after the interaction is given by:

$$T_{out} = T_{in} + (T_{element} - T_{in}) * (1 - e^{\Delta t / t1})$$

where $T_{element}$ is the temperature of the component, $\Delta t$ is an interaction time, and $t_1$ is a time constant for the interaction. This formula assures that the resulting temperature is between $T_{element}$ and $T_{in}$. The interaction time is a function of blower speed: one would normally expect interaction time to be inversely proportional to blower speed, but in the case of interaction with the heater core 34 the data indicate a direct proportionality.

The system of FIG. 16 starts with air at either $T_{ambient}$ or $T_{incar}$, depending on the position of the recirculation door 28. This air interacts first with the A/C core or evaporator 36 (assuming no temperature change through the blower wheel 32) and then is divided into two paths by the blend door 26. One fraction of the air interacts with the heater core 34 and the remainder passes by to rejoin and mix with the heated air. One assumes the fraction of air routed to the heater core 34 is directly proportional to the blend door position (however, any more appropriate function could be substituted therefor). The final interaction is with the walls of the discharge ducting beyond the blend door 26.

Assuming the walls are at $T_{incar}$, interaction time, as well as $T_{wall}$, depends on door positions. The various parameters of this model are chosen either by common sense or by hand fitting to data. For example, one uses 44 deg. as $T_{evaporator}$, ECT as $T_{heater}$, and as mentioned, $T_{incar}$ as $T_{wall}$. The time constants for the interactions are all hand fit. For example, the data indicate $t_1$ is large, i.e., $T_B \approx T_{evaporator}$. As mentioned before, interaction time is proportional to blower speed in the case of the heater core 34.

The fitting of the parameters could also be done via a more rigorous procedure such as least squares.

The calculated value for discharge temperature from this model is filtered with a 15 second time constant to give the final value used by the preferred control strategy as described below. This approach obviates the need for an additional sensor but still gives discharge temperature within a few degrees of actual values.

A control algorithm is a name for the mathematical process that takes sensor inputs and produces control outputs. There is described in detail below a control strategy based on fuzzy logic as illustrated by rule sets 46 in FIG. 2 for control of temperature regulation and passenger comfort.

In the block diagram of the fuzzy logic system of FIG. 2, sensor inputs are conditioned, scaled, and passed to a fuzzy inference engine of the controller 40. Rule sets for the various control functions—blower speed, offset, target set point, mode shift, recirculation/fresh mode shift, term calibrations, etc. provide the inference engine with the details of the strategy to be performed. The fuzzy outputs are scaled and passed to the routines to control the motors, actuators, and doors that accomplish the flow and conditioning of the air supplied to the passenger compartment. The rule set basis for control organizes the strategy in a manner that allows easy calibration and adjustment of the control operation.

Control algorithms should take into account that a range of discharge temperatures is not experienced as being very pleasant. The usual approach is to "hide" the air produce by the plant when its temperature is within a certain range. The air is "hidden" by directing it partially through the defrost outlet and partially to the floor rather than through the panel. The present application describes a means whereby an uncomfortable range of temperatures is not produced at all, yet regulation and passenger comfort are maintained.

The exclude air algorithm operates by holding discharge air temperature just below the lower limit (i.e. 80 degrees) of the uncomfortable range when this region is approached from below and holding discharge temperature just above the uncomfortable range (i.e. 96 degrees) when approached from above. FIG. 12 is a graph of the dependence of discharge air temperature as a function of blend door position (with other variables held constant) showing the region of excluded temperatures (i.e. 80 degrees–96 degrees). The approach to this region is detected by any of a number of methods: actual measurement of discharge temperature, modeling of discharge temperature from the sensor and actuator information known, or blend door attaining particular upper or lower positions for certain conditions of ambient temperature and set point temperatures. As in FIG. 2, blend door position is fed back to the controller 44 by way of a return arrow.

Figure 6:
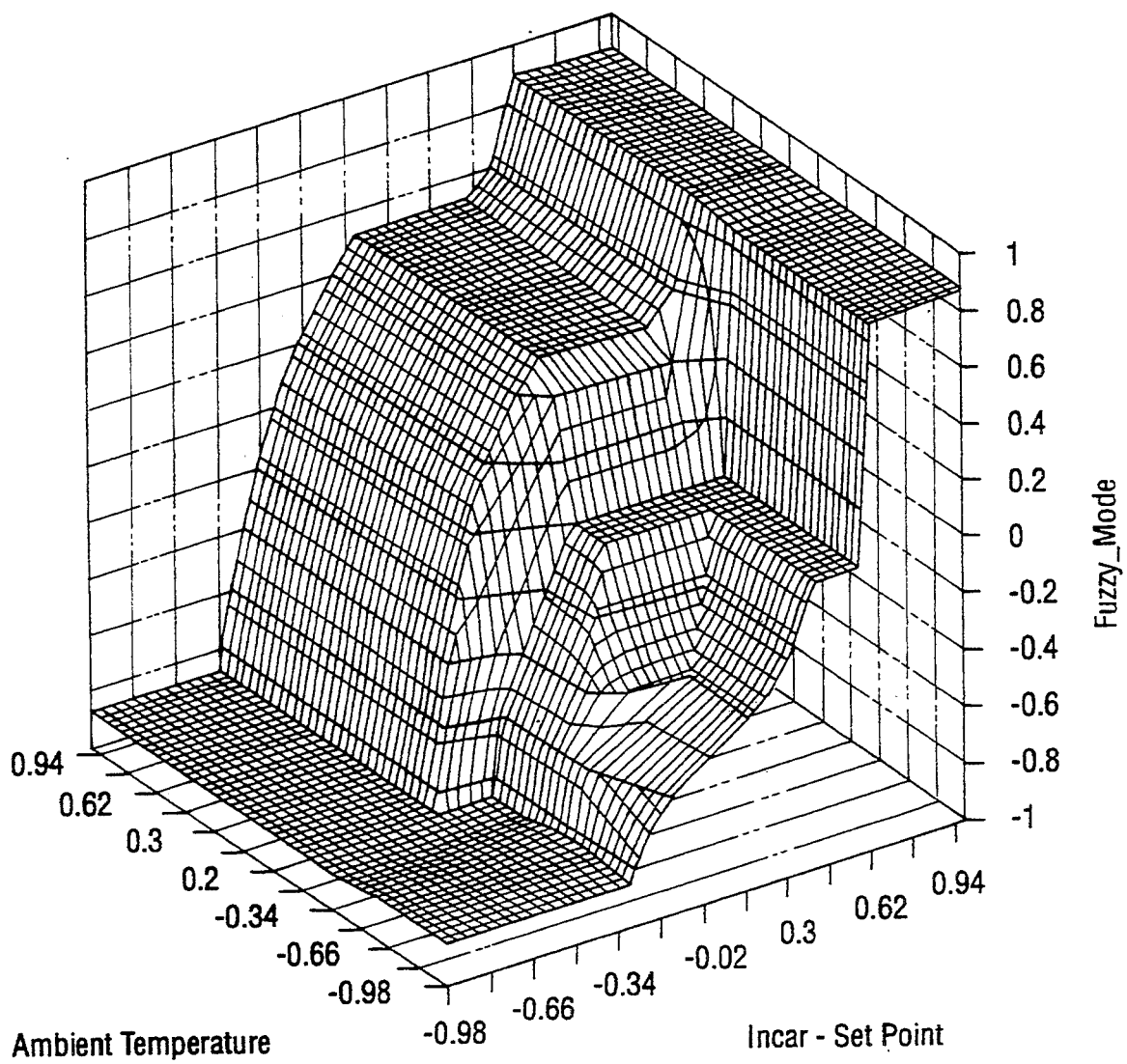
FIG. 6 is a graphical response surface resulting from the rule set of FIGS. 5a through 5l.

Implementation of this strategy is by calculation of a variable called fuzzy_mode, conditioned on ambient temperature and regulation error as indicated in FIG. 6 wherein other variables such as sunload and discharge temperature are assumed to be constant. The value of this variable determines when mode transitions occur (as indicated by the arrows in FIG. 12). If the current mode is floor and this variable exceeds a certain threshold, the mode switches to panel (i.e. vacuum motor moves floor-panel door 24 to its NV position with the panel-defrost door in its V position). If the current mode is panel and this variable drops below a certain threshold, the mode switches to floor (i.e. vacuum motor moves floor-panel door 24 to its V position with the panel-defrost door 22 to its V position).

FIG. 6 shows the value of fuzzy_mode as a function of regulation error and ambient temperature (these are shown scaled between −1 and 1 rather than their actual ranges of −20 to +20 for regulation error and 10 and 120 for ambient temperature). The L-shaped flat region in the middle of the surface evaluating to zero. The size of this region determines the hysteresis in switching between modes.

Equation 1 below shows a prior art linear control formula. The control value calculated is scaled and used for both blower speed and blend door actuation. The coefficients, $K_1$, $K_2$, $K_3$, and $K_4$ are constant gains that must be calibrated to compensate for the effect of their respective terms on the resulting control.

$$Control\_Value = Offset - K_1*SUN + K_2*(Set\_Point-75) + K_3*(75-Ambient) + K_4*(Set\_Point-Incar) \quad (1)$$

In fuzzy-linear control of the present application, the calculation takes the same form as in Equation 1 above, only some of the coefficients and variables are now fuzzy output variables. Consider, for example, $$\underline{FL\_Value} = \underline{Offset} - \underline{G_1}*SUN + \underline{G_2}*(Set\_Point-75) + \underline{G_3}*(75-Ambient) + \underline{G_4}*(\underline{Target}-Incar), \quad (2)$$

where all the underlined symbols represent fuzzy output variables calculated as functions of the sensor inputs. By "fuzzy output variable," one means variables calculated from the sensor inputs according to the usual fuzzy logic Max-min algorithm as described in the above-noted paper of Mamdani using a set of rules. This form obviously subsumes linear control in its possible control behavior, but it can be appropriately nonlinear and also includes direct fuzzy control as is described hereinbelow.

Choosing any of the various gains to be fuzzy variables allows calibration blending. Suppose one obtained calibration values for $G_4$ of 0.45 during winter tests, 0.50 during the spring, and 0.60 for the summer. The fuzzy evaluation process illustrated in FIGS. 11a through 11f could be used to blend these calibration values in a reasonable fashion as a function of ambient temperature. No one value of calibration need be agreed upon and chosen, instead ambient temperature is used as an indicator of which calibrations come into play in determining the value of $G_4$.

The fuzzy variable, "Target," in Equation 2 can be used to compensate for variation of control most logically associated with set points changes, either from physical, mechanical, or even psychological causes. For example, suppose it is determined that what most customers mean by a 72 degree set point is "comfortable", a set point of just that value for most circumstances—but for different seasons that translates into different temperatures. In winter "comfortable" might mean an actual temperature of 75 degrees even though the customer setting is at 72 degrees. In summer, it might be an actual value of 68 degrees for a setting of 72. FIGS. 11a through 11f illustrate how this customer "offset-in-meaning" might be compensated for via the Target fuzzy variable. One chooses Target=Set_Point+Target Adjust, where Target Adjust behaves according to the graph.

Figure 7A:
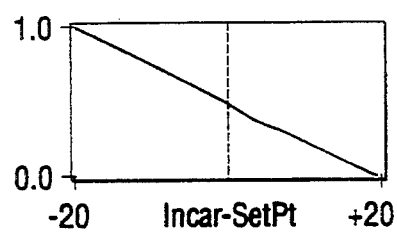
FIGS. 7a through 7p are graphical illustrations of an offset rule set including antecedent and corresponding membership functions.
Figure 7B:
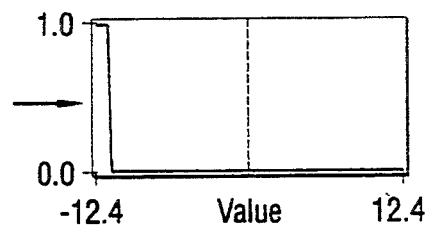
Figure 7C:
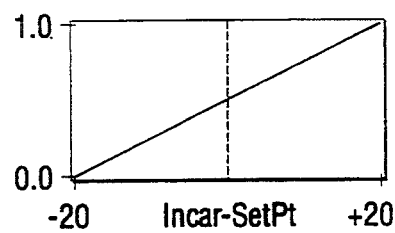
Figure 7D:
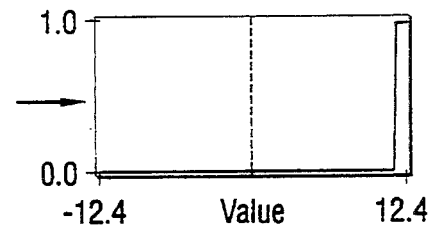
Figure 7E:
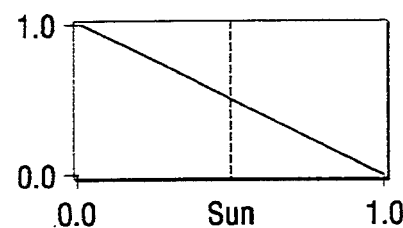
Figure 7F:
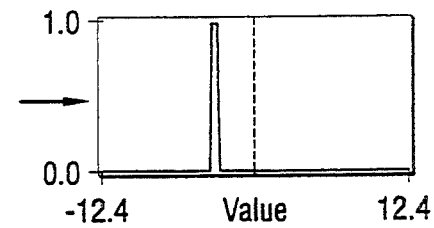
Figure 7G:
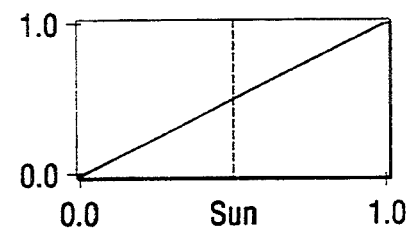
Figure 7H:
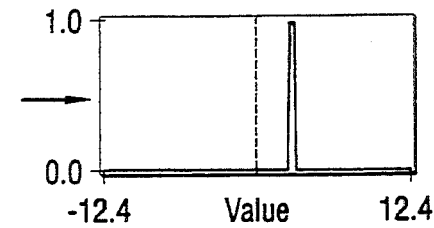
Figure 7I:
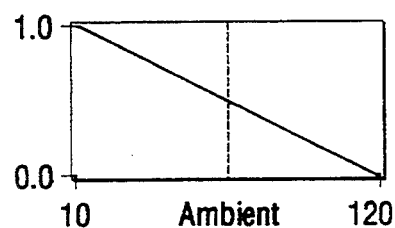
Figure 7J:
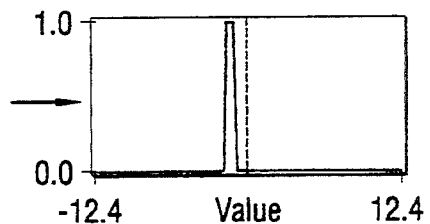
Figure 7K:
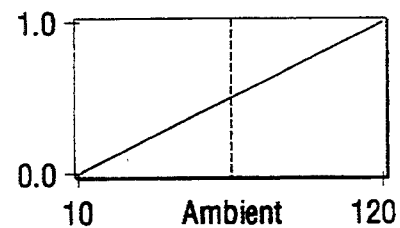
Figure 7L:
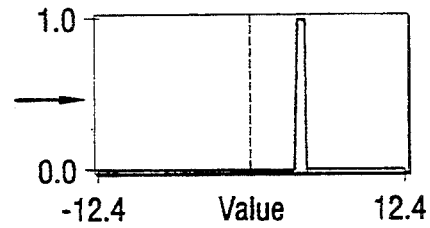
Figure 7M:
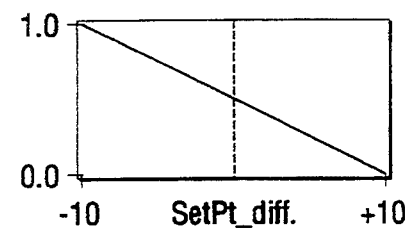
Figure 7N:
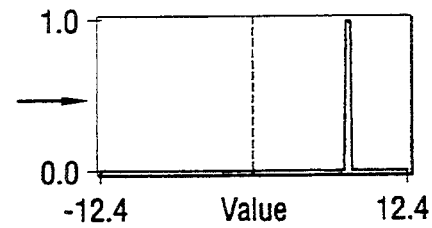
Figure 7O:
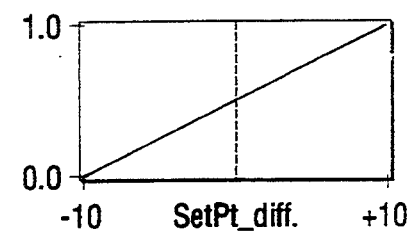
Figure 7P:
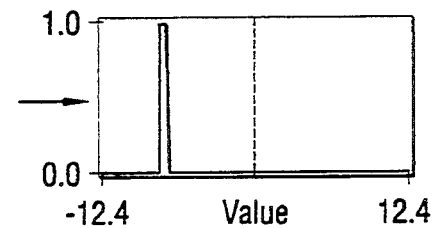
Figure 8A:
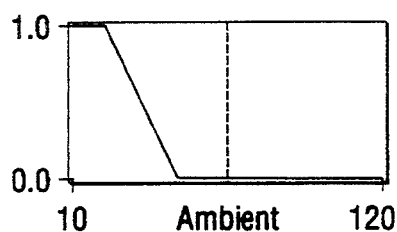
FIGS. 8a through 8f are graphical illustrations of a target adjust rule set including antecedent and corresponding membership functions.
Figure 8B:
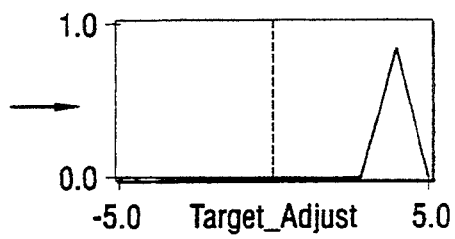
Figure 8C:
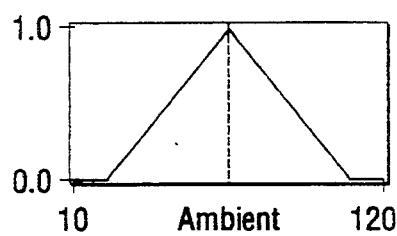
Figure 8D:
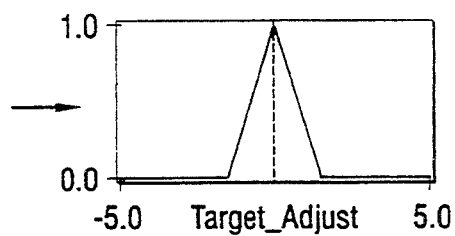
Figure 8E:
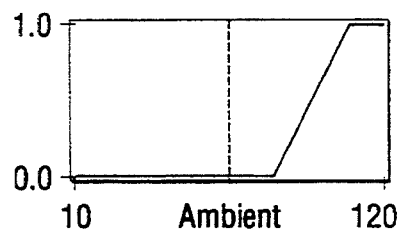
Figure 8F:
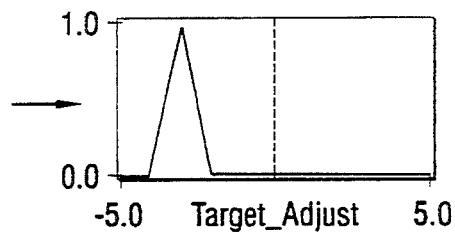
Figure 9:
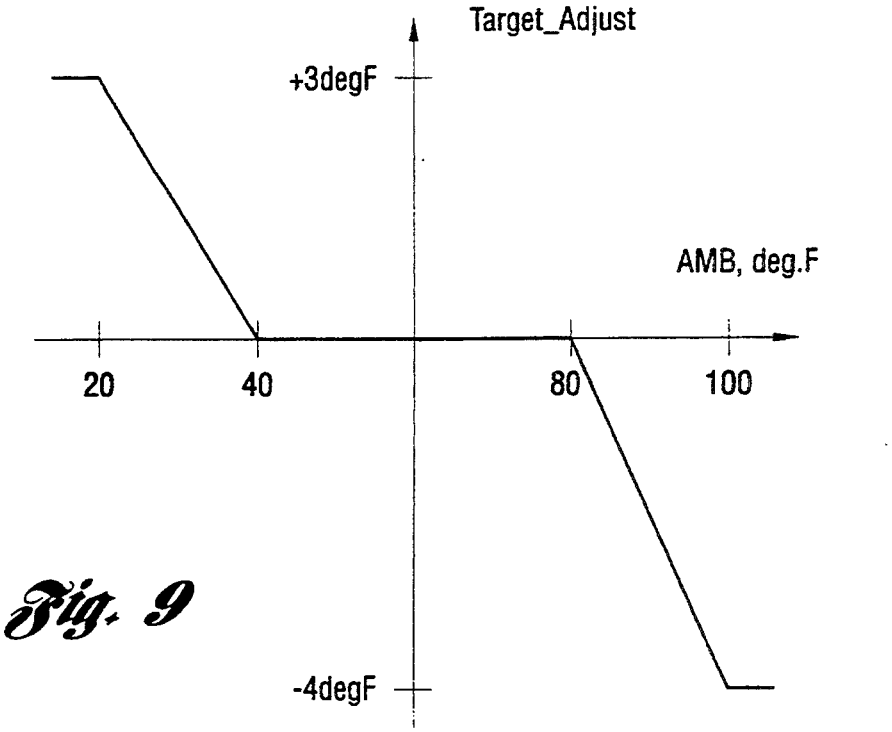
FIG. 9 is a graph of a variable target adjust as a function of ambient temperature.
Figure 10A:
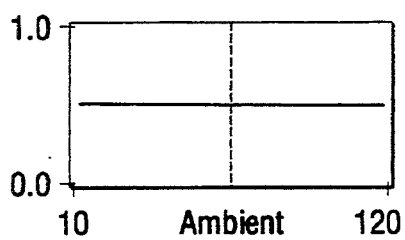
FIGS. 10a through 10f are graphical illustrations of a gain variable, $G_3$, rule set including antecedent and corresponding consequent membership functions.
Figure 10B:
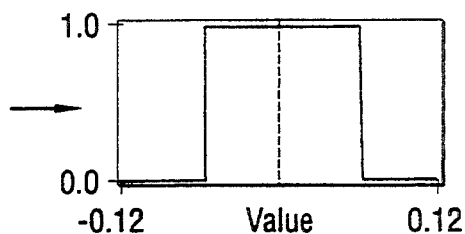
Figure 10C:
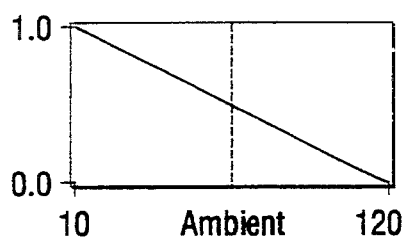
Figure 10D:
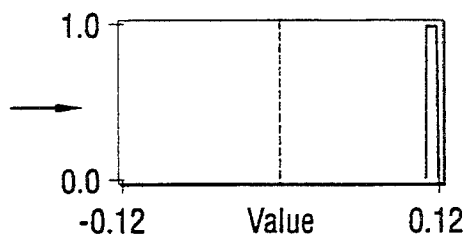
Figure 10E:
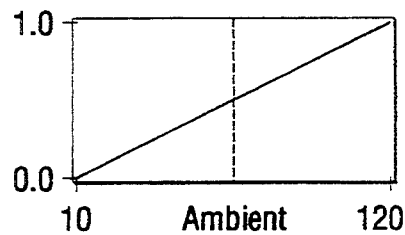
Figure 10F:
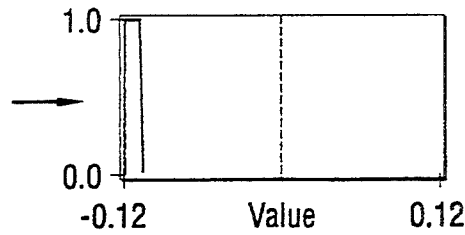
Figure 11A:
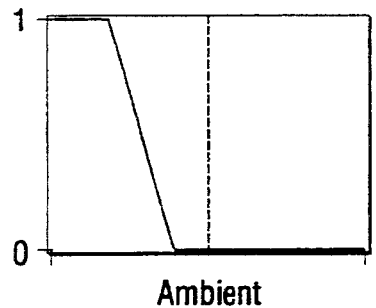
Figure 11B:
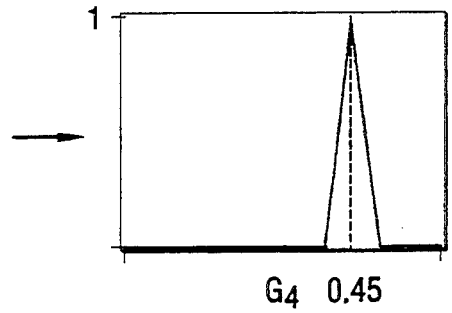
Figure 13:
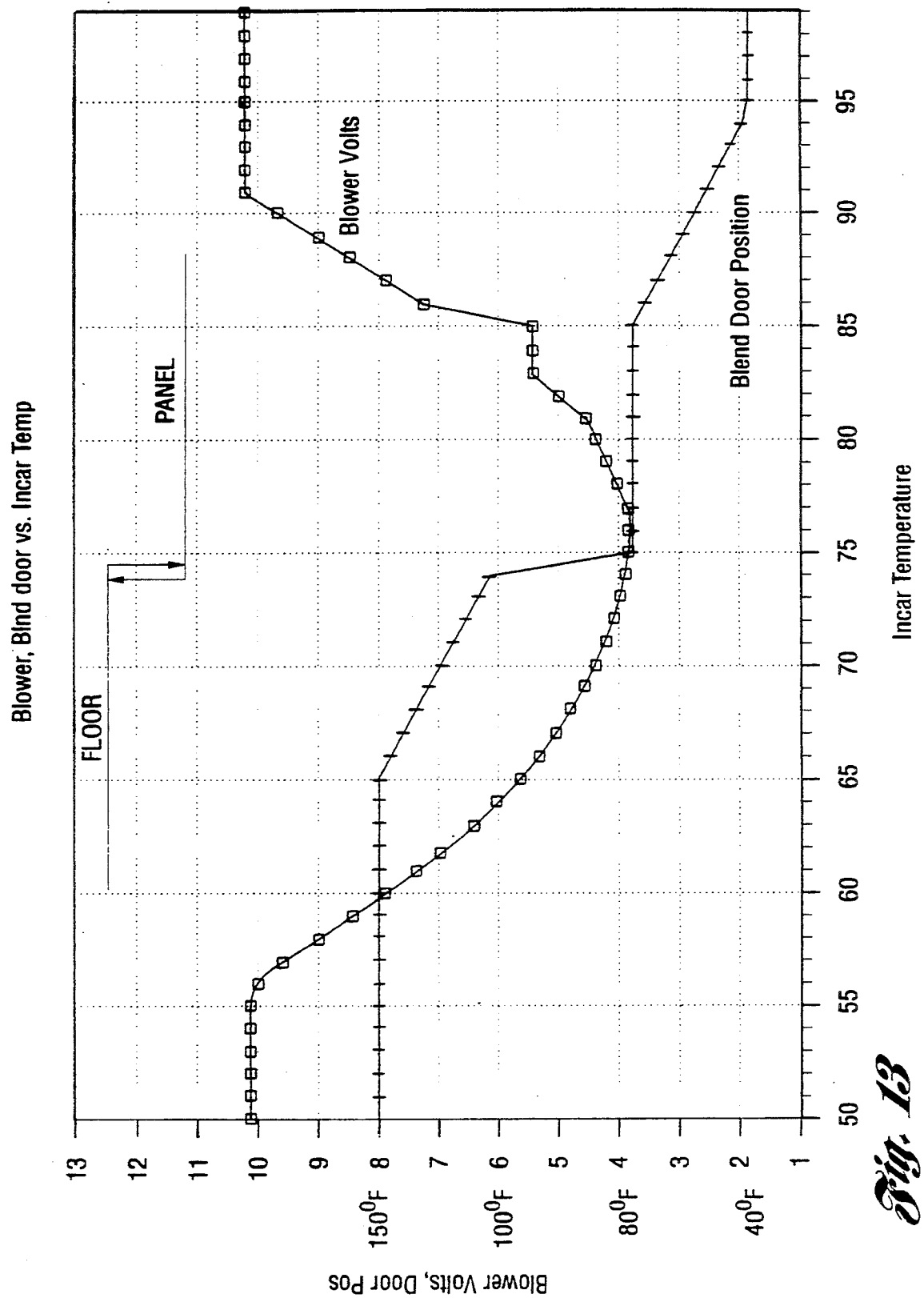
FIG. 13 are graphs of blower motor voltage and blend door positions versus in-car temperature.

The fuzzy variable, Offset, in Equation 2 is used to compensate for all other nonlinear effects that do not fall easily into the above categories. FIGS. 7a–7p show the membership functions which define the offsets. If, for example, for cold-weather starting, one wanted to block air flow over the heater core 34 to allow the engine to warm up more quickly, Offset would be chosen to be a fuzzy variable of engine temperature. The value of Offset would be blended between its usual calibration value and a value that would fully block the heater core 34 as a function of engine temperature in the same way gains were blended as a function of ambient temperature.

The fuzzy output variable $G_3$ in Equation 2 is used to compensate for a higher rate of loss of heat when the outside temperature is very cold. One simply adds a rule stating that if AMB is LOW, then $G_3$ is high (relative to its normal value).

All these features provide the advantages of nonlinear control that, for example, direct fuzzy logic control could provide, but with a simpler, more natural organization that will allow easier calibration and adjustment with attendant shortening of development time.

Referring again to FIGS. 1 and 2 in combination with FIGS. 3a-3m and FIG. 4, the desired blower speed of an automobile heating/air conditioning system 20 can be considered a function of temperature error (in-car temperature—set point temperature) and engine coolant temperature (ECT). If the error is small, low blower speed is desired. If the error is positive and high (it's hot inside), high speed is needed to cool the cabin down. If the error is negative (it's cold inside) and the engine is cold, a little speed is needed for defrost but if the engine is warm, high speed is needed to heat up the cabin. The descriptions "small error", "high speed", etc., are defined by the membership functions in the set of rules shown in FIGS. 3a-3m.

In FIGS. 3a-3m, the degree to which a rule holds is computed from the antecedent membership functions on the left which are dependent on their respective input values. The consequent membership functions on the right define the degree of control action (blower speed) to be taken when the antecedent condition pertains.

The heuristic rules for blower speed are as follows:
1. If Incar is close to Set Temperature, then the blower tends toward a low speed;
2. If Incar-Set is high, then the blower tends toward a high speed;
3. If the Ambient Temperature is very hot or very cold and Incar is close to Set Temperature, then the blower tends toward a medium speed;
4. If Incar-Set is negative and Engine Coolant Temperature is high, then the blower tends toward a high speed; and
5. If the Ambient Temperature is low and Engine Coolant Temperature is low, then the blower tends toward a low speed.

In this way, blower speed varies with ECT (100°–180° F.); blower speed slowly increases to clear residual air unnoticeably; and noise from the blower is reduced due to smooth increase in speed.

Figure 4:
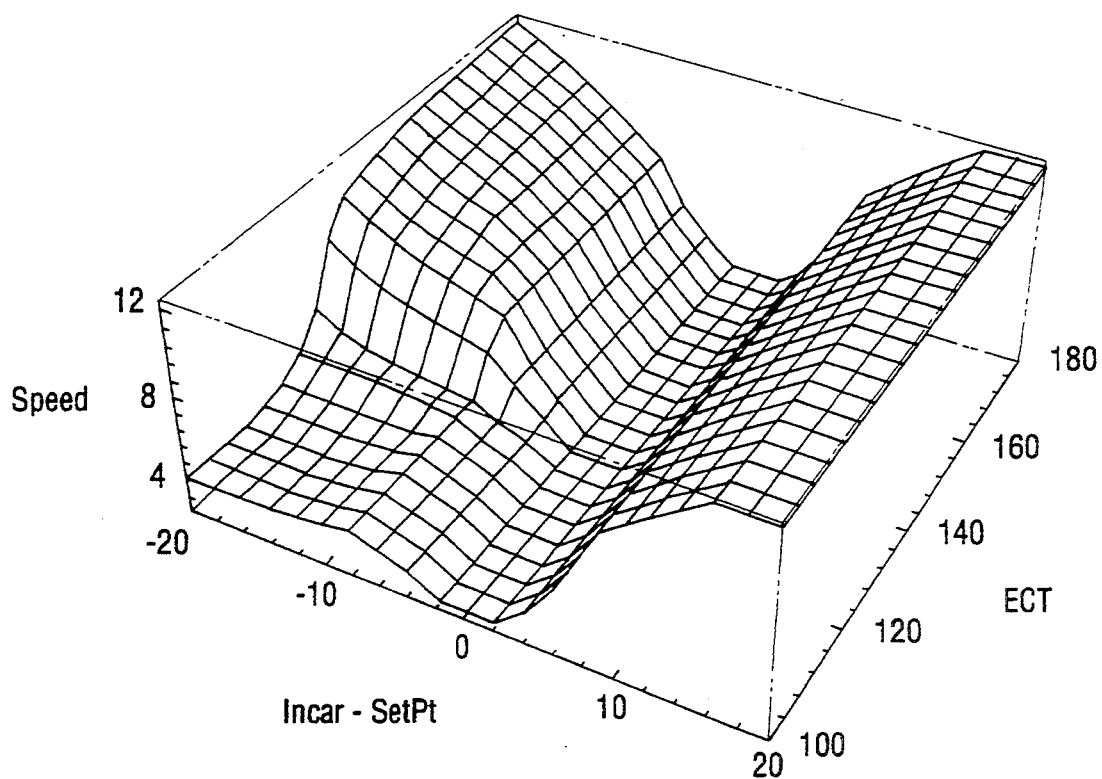
FIG. 4 is a graphical response surface resulting from the rule set of FIGS. 3a through 3m.
Figure 5A:
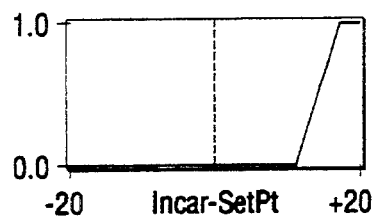
FIGS. 5a through 5l are graphical illustrations of a mode shift rule set including antecedent and corresponding membership functions.
Figure 5B:
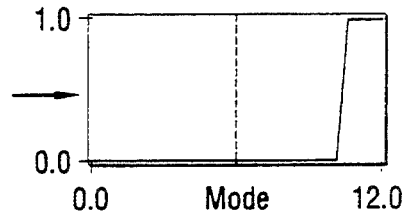
Figure 5C:
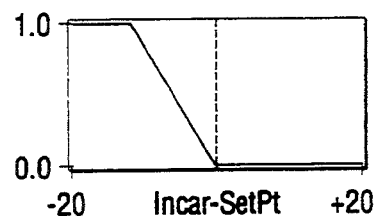
Figure 5D:
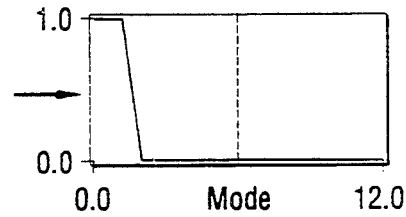
Figure 5E:
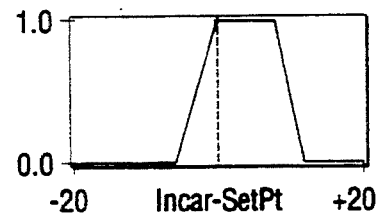
Figure 5F:
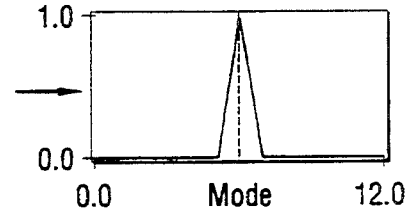
Figure 5G:
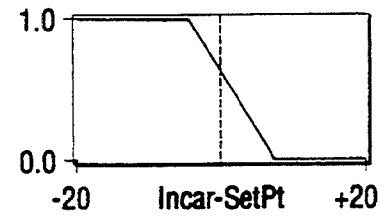
Figure 5H:
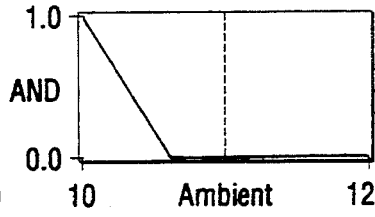
Figure 5I:
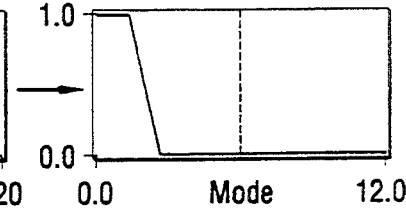
Figure 5J:
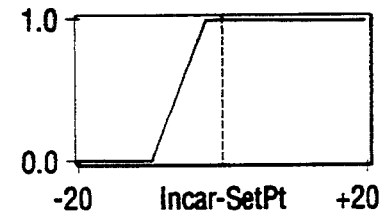
Figure 5K:
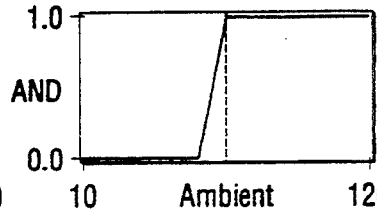
Figure 5L:
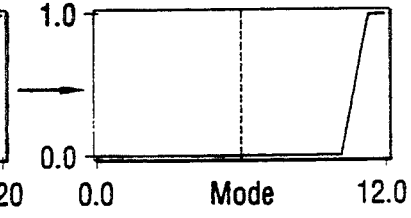

Evaluating the five rules gives the response shown in FIG. 4. In other words, FIG. 4 illustrates the response surface resulting from the rule sets in FIGS. 3a through 3m. Blower speed as a function of engine coolant temperature (ECT) and in-car minus set point temperature difference. The temperature difference and ECT are in units of degrees Fahrenheit, and blower speed is scaled to blower fan volts. This rather nonlinear response makes sense for each of the conditions described in the rules stated, but smoothly interpolates between the regions.

Fuzzy logic is naturally nonlinear. Linear control is subsumed by fuzzy control, and it is possible to make fuzzy control linear, if wanted. In many control problems, nonlinearity is associated with difficulties. The nonlinearities arising from fuzzy control, however, follow naturally from the logic of the strategy desired. If the strategy is appropriate to the problem, there should be no particular difficulty with the resulting nonlinear response. Any of a number of other methodologies, for example, lookup tables, could produce the same desired response that one sees in FIG. 4. On the other hand, the descriptive organization that leads to the response is particularly simple and understandable in the case of fuzzy logic. It is the organization of the control strategy in the form of a set of rules that makes the fuzzy logic strategy easy to understand and maintain.

Another feature of the fuzzy control algorithm is that the response in any particular corner (say, in this example, the amount of blower speed for defrost) may be adjusted separately, without affecting the response elsewhere. If some area of the control space requires unique attention, a rule may be added to provide sufficient control without affecting the control action in other areas of the control space.

Referring again to FIG. 2, the fuzzy logic climate controller 40 preferably uses a Motorola 68HC11 microprocessor for its calculations. This microprocessor has 512 bytes of RAM and 12 kilobytes of ROM built in. It uses an 8 megahertz clock providing a 500 nanosecond instruction cycle time. An eight channel analog-to-digital converter is integrated into the microprocessor. Four of the eight channels are used to measure inputs that are used by the control system, namely: ambient (outside) temperature, engine coolant temperature, interior temperature, and sunload. A further input to the system is the set point temperature which may be adjusted by the vehicle occupants using buttons on the front face of the control unit. The system outputs are: intake air mode, discharge air mode (fresh air or recirculate), blend door position, and blower speed. The latter two outputs are continuous-valued, the former discrete. The fuzzy logic control calculation takes scaled input values and produces a single relative output value. Since there are four system outputs, there are four rule sets. For the continuous-valued outputs, the fuzzy logic output value is scaled and used directly; for the discrete outputs, the output values are compared to thresholds to generate particular modes or states of the system.

The controller 40 is preferably programmed primarily in C and cross-assembled into microprocessor instructions. Each fuzzy rule set is incorporated into the fuzzy engine as a set of tables that have been previously converted into a form that allows for efficient calculation during run time. The fuzzy logic control procedure is called as part of the main loop, which is executed every 30 milliseconds. The fuzzy logic engine occupies approximately 600 bytes of ROM and uses 12 bytes of RAM during its execution. Execution time for a fuzzy calculation is typically 20 milliseconds.

Referring again to FIG. 2, the main inputs to the fuzzy engine are incar-set temperature difference and absolute engine coolant temperature. Set or target temperature is obtained from a linear combination of incar-set, 75-ambient, and set-75 temperature differences, along with input from the sunload sensor. Target temperature is defined as the incar temperature which the system is trying to reach to produce the zero error.

During hot engine operation, the blower voltage versus target temperature is roughly shaped as a "V"

curve with the minimum in blower voltage occurring at target temperature. As incar temperature deviates from target temperature, blower voltage increases on either side of target. Through shaping of the fuzzy logic input membership curves, optimum blower voltage is obtained for any incar-target temperature error.

During warm-up from a cold start, under heating conditions, the fuzzy rules obtaining their input from engine coolant temperature come into action. If ECT is less than CELO temp (110° F.), the blower voltage is held at a minimum and the defrost mode is in effect. AT CELO temperature, a mode shift to mixed mode occurs. Mixed mode stays in effect for 10 seconds and is then followed by floor mode. Above CELO temp, and up to 180° F., there is a gradual increase in the blower output, finally reaching a maximum value that would be normally obtained under hot engine conditions. This blower ramping is controlled through shaping of the fuzzy logic rules accepting ECT and incar-target temperature error.

The blend door strategy is implemented as a linear combination of incar-set, 75-ambient, set-75 and sunload values. The blend door action is enhanced through a feature that excludes certain discharge air temperatures. Because it is undesirable to discharge warm air out the panel ducts and cold air from the floor ducts, the blend door position is locked at certain positions to prevent improper discharge air temperatures when approaching mode transitions. These locked positions track with mode shift hysteresis and produce a coordinated control between discharge air temperatures and mode shifting.

In addition, in order to better coordinate discharge air temperatures with mode shifting, mixed mode can only be entered in automatic mode during the floor to panel mode shift and not the panel to floor mode shift. During mode shifts, the secondary door positions are slightly delayed in time so that the blend door has the opportunity to reach its new target position before actual mode transitions occur.

Referring now to FIGS. 5a through 5l, the desired mode for directing air in the HVAC system 20 can be considered a function of ambient temperature and temperature error (linear temperature—set point temperature). Descriptions are defined by the membership functions in the set of heuristic rules shown in FIGS. 5a through 5l and as follows:

1. If Incar-Set is high, then mode tends toward Panel;
2. If Incar-Set is low, then mode tends toward Floor;
3. If Incar is close to Set temp, then mode tends toward the middle of Floor and Panel;
4. If Incar-Set is low and Ambient Temperature is low, the mode tends toward Floor; and
5. If Incar-Set is high and Ambient Temperature is high, then mode tends toward Panel.

Evaluating the five rules gives the response shown in FIG. 6.

Figure 14:
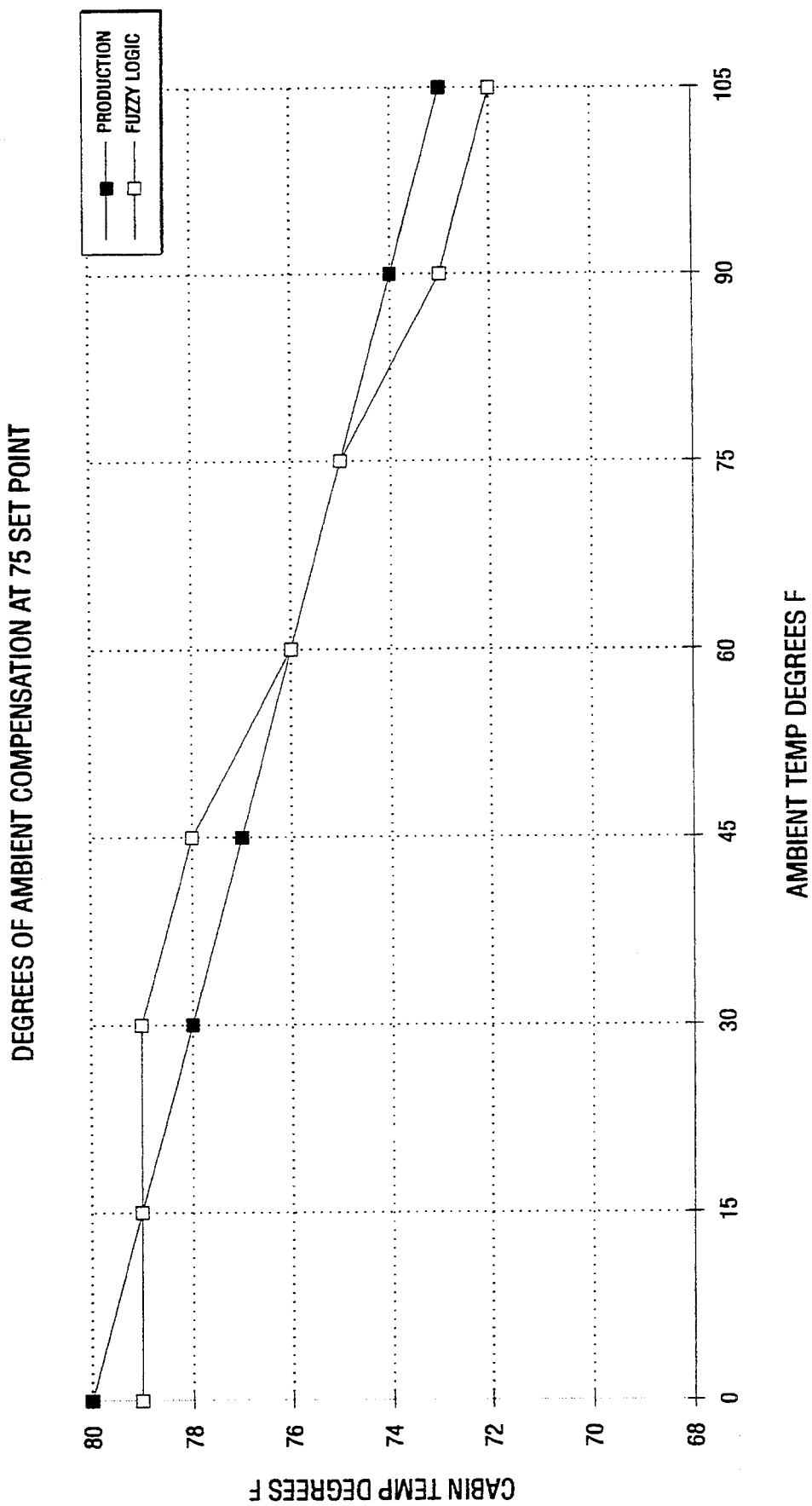
FIG. 14 are graphs of cabin temperature versus ambient temperature for the prior art and the present invention at 75 degree set point.
Figure 15:
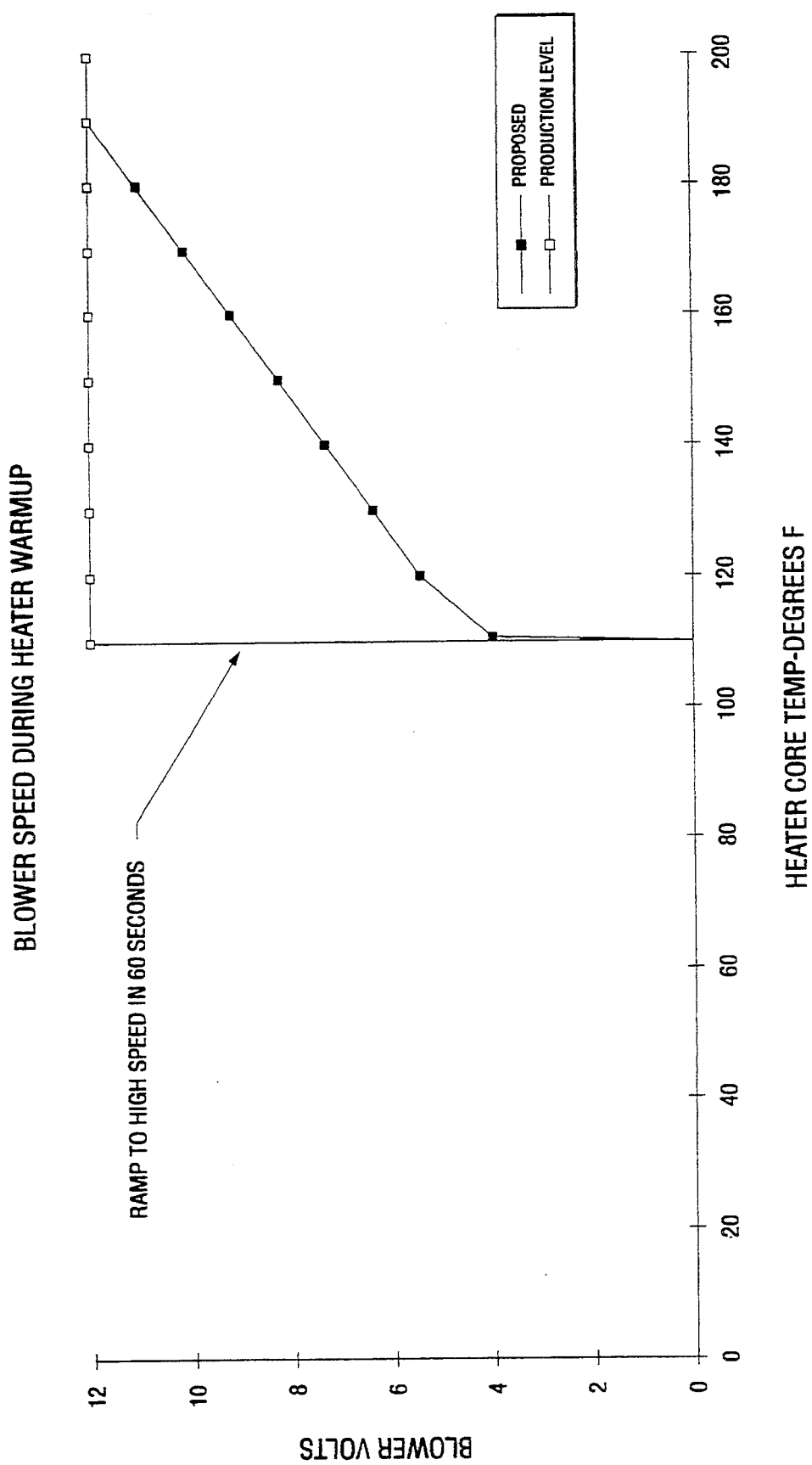
FIG. 15 is a graph of blower speed versus engine coolant temperature during heater warm-up.

The method and system of the present invention provide numerous advantages. For example, occupant comfort is able to be maintained more reliably over a greater range of conditions. In particular, the comfort rating as ambient temperature varies is judged noticeably superior to the prior art linear strategy. FIG. 14 shows the response of the system to a steady increase in ambient temperature and how it varies considerably from the existing linear strategy. It matches at the extreme and mid-range temperatures but has been adjusted through testing to improve comfort and respond differently elsewhere.

The system is also able to address particular customer concerns in certain regions of operation. Blower speed oscillations are removed, thus diminishing a problem with erratic blower noise. Another area of customer concern, that of blower speed onset in cold weather has been discussed above. The method and system responds to the slow rise of the engine coolant temperature by bringing up blower speed slowly, allowing the system to unnoticeably rid the ducts of the residual cold air and gradually bring the blower to its ideal speed as shown in FIGS. 3a–3m. The shape of the blower speed onset curve can be tailored by adjusting the membership functions of FIGS. 3a–3m.

The use of the present invention in climate control systems strategy results in improved occupant comfort. The ability to tailor gradual, nonlinear response has allowed the design of the strategy to address certain situations that have not been handed gracefully in the past. In particular, concerns such as blower speed onset during warmup in cold weather and ambient temperature compensation have been ameliorated by appropriate use of the additional flexibility that the present invention provides.

New vehicle programs and the requirements of simultaneous engineering are reducing the time available to develop new automatic climate control strategies. Consequently, the control strategy should be developed at the same time that the HVAC system is being designed. The organization and flexibility of the present invention allow one to develop a set of base rules even before the characteristics of a HVAC system have been finalized.

While the best mode for carrying out the invention has been described in detail, those familiar with the art to which this invention relates will recognize various alternative designs and embodiments for practicing the invention as defined by the following claims.

We claim:

1. A method for automatically controlling a heating, ventilation and air conditioning (HVAC) system of a vehicle which discharges a flow of air at a discharge temperature to a passenger cabin of the vehicle, the system including a variable speed blower, means for varying air temperature, ducting, actuators having control modes for controlling the direction of air flow and the ratio of fresh air to recirculated air and sensors for sensing temperature within the cabin, ambient temperature and a target set point temperature, the method comprising the steps of:

determining the difference between temperature within the cabin and the target set point temperature to obtain a difference signal;

defining membership functions and fuzzy rules between the difference signal and the control positions of the actuators; and generating a set of control signals to control the control mode of the actuators to prevent the system from discharging a flow of air into the cabin having a predetermined range of temperatures defined by first and second predetermined temperatures, the step of generating being based on the difference signal, and the discharge temperature, the membership functions and the fuzzy rules wherein the system is prevented from discharging a flow of air having a temperature within the predetermined range of temperatures into the cabin by controlling the temperature of the discharged air to be below the first predetermined temperature as the temperature of the air increases and approaches the first predetermined temperature and to be above the second predetermined temperature as the temperature of the discharged air decreases and approaches the second predetermined temperature.

2. The method as claimed in claim 1 further comprising the step of defining membership functions and fuzzy rules between the ambient temperature and the control modes of the actuators and wherein the step of generating is also based on the ambient temperature.

3. The method as claimed in claim 1 wherein one of the sensors senses sunload temperature and wherein the method further comprises the step of defining membership functions and fuzzy rules between the sunload temperature and the control modes of the actuators and wherein the step of generating is also based on the sunload temperature.

4. The method as claimed in claim 1 wherein the system is prevented from discharging air having a temperature within the predetermined range of temperatures into the cabin as long as the temperature of the air in the ducting is below a third predetermined temperature and above a fourth predetermined temperature.

5. The method as claimed in claim 4 wherein the second and third predetermined temperatures are substantially equal.

6. The method as claimed in claim 4 wherein the first and fourth predetermined temperatures are substantially equal.

7. A control system for automatically controlling a heating, ventilation and air conditioning (HVAC) system of a vehicle which discharges a flow of air at a discharge temperature to a passenger cabin of the vehicle, the HVAC system including a variable speed blower, means for varying air temperature, ducting, actuators having control modes for controlling the direction of air flow and the ratio of fresh air to recirculated air and sensors for sensing temperature within the cabin, ambient temperature and a target set point temperature, the system comprising:

means for determining the difference between temperature within the cabin and the set point temperature to obtain a difference signal;

means for defining membership functions and fuzzy rules between the difference signal and the control positions of the actuators; and means for generating a set of control signals to control the control mode of the actuators to prevent the HVAC system for discharging a flow of air into the cabin having a predetermined range of temperatures defined by first and second predetermined temperatures, the means for generating the set of control signals being based on the difference signal the discharge temperature, the membership functions and the fuzzy rules wherein the HVAC system is prevented from discharging a flow of air having a temperature within the predetermined range of temperatures into the cabin by controlling the temperature of the discharged air to be below the first predetermined temperature as the temperature of the air increases and approaches the first predetermined temperature and to be above the second predetermined temperature as the temperature of the discharged air decreases and approaches the second predetermined temperature.

8. The system as claimed in claim 7 further comprising means for defining membership functions and fuzzy rules between the ambient temperature and the control modes of the actuators and wherein the means for generating generates the set of control signals also based on the ambient temperature.

9. The method as claimed in claim 8 wherein one of the sensors senses sunload temperature and wherein the system further comprises means for defining membership functions and fuzzy rules between sunload temperature and the control modes of the actuators and wherein the means for generating also generates the control signals based on the sunload temperature.

10. The system as claimed in claim 7 wherein the HVAC system is prevented from discharging air having a temperature within the predetermined range of temperatures into the cabin as long as the temperature of the air in the ducting is below a third predetermined temperature and above a fourth predetermined temperature.

11. The method as claimed in claim 10 wherein the second and third predetermined temperatures are substantially equal.

12. The method as claimed in claim 10 wherein the first and fourth predetermined temperatures are substantially equal.

* * * * *